May 14, 1968     E. WUKOWITZ     3,382,833
HIGH-SPEED MOTORBOAT HULL
Filed June 8, 1966     2 Sheets-Sheet 1

INVENTOR
Edward Wukowitz
BY
ATTORNEYS.

May 14, 1968  E. WUKOWITZ  3,382,833
HIGH-SPEED MOTORBOAT HULL
Filed June 8, 1966  2 Sheets-Sheet 2
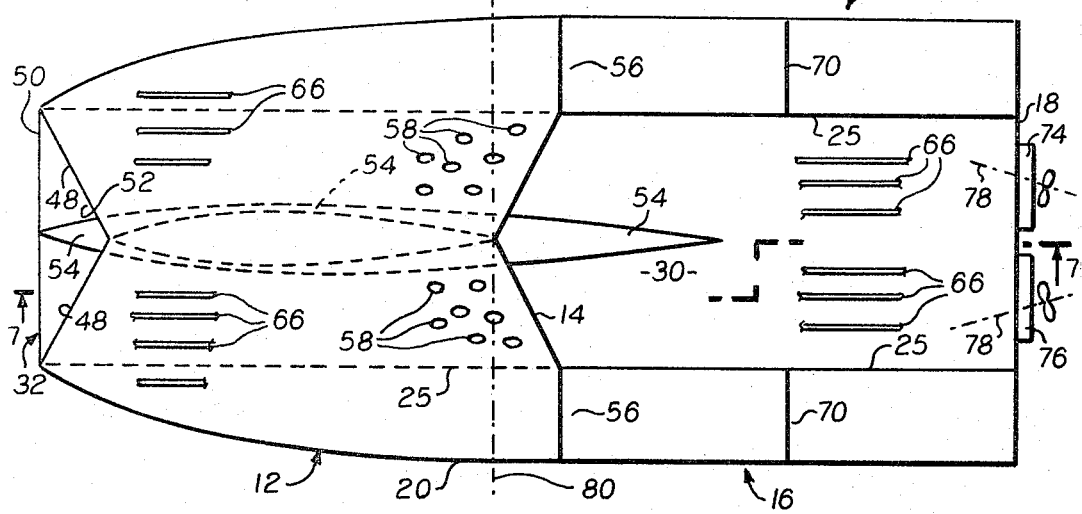
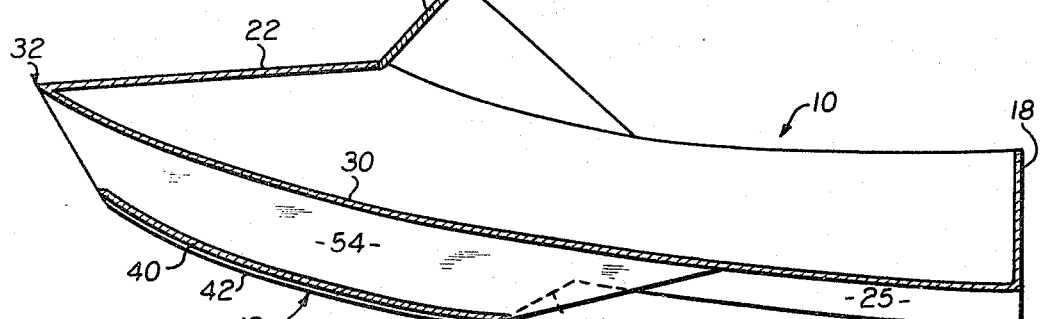
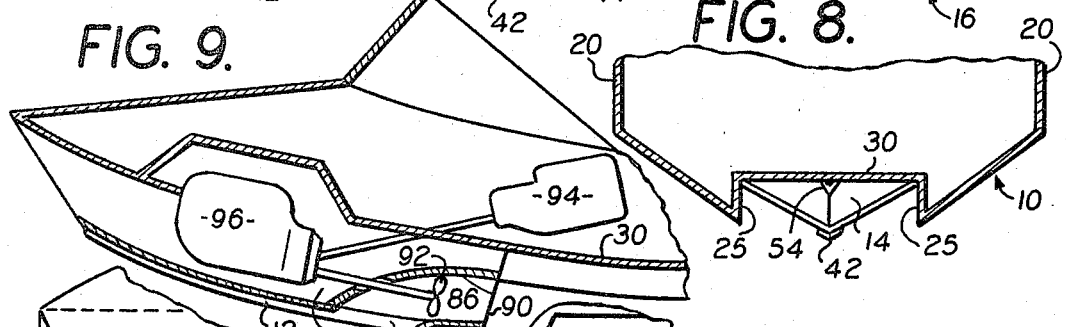
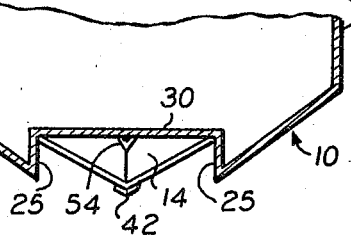
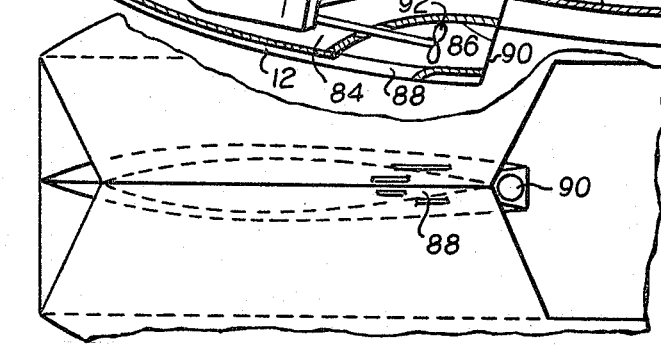
INVENTOR
Edward Wukowitz
BY Sandoe, Neill,
Schottler & Wilstrom
ATTORNEYS.

United States Patent Office 3,382,833
Patented May 14, 1968

3,382,833
HIGH-SPEED MOTORBOAT HULL
Edward Wukowitz, 29 Wells Ave., Congers, N.Y. 10920
Filed June 8, 1966, Ser. No. 556,000
12 Claims. (Cl. 114—66.5)

ABSTRACT OF THE DISCLOSURE

This specification discloses a boat hull having an air chamber formed by a double bottom extending from the stem to an amidship location where the outer bottom terminates in a step. The chamber is open at its forward end at a location above the water line for scooping in air when the boat is under way. The opening slopes rearwardly as it extends downwardly so that as the angle of attack of the hull increases, the effective area of the opening increases and the pressure of the air in the chamber increases correspondingly so that more air discharged at the step for increasing the buoyancy of the hull beyond the step. The bottom of boat beyond the step is an inverted channel which holds the air trapped as the air travels aft to the end of the channel at the transom of the hull. The sides of the channel are preferably catamaran sections.

Summary of the invention

This invention relates to high-speed boat hulls.

One object of the invention is to provide a boat hull of the step type with an air supply to the step across the entire width, or most of the width, of the step without having any obstruction within the hull such as piping, ducts or other air supply means.

Another object is to provide a boat hull with a double bottom forward and with the space between the inner and outer bottoms open both forward and aft for passage of air to the portion of the hull beyond the forward section. Air is retained under the after portion of the hull by means of side runners, and preferably by cat (catamaran) sections of the hull. Use of catamaran sections produces a softer ride and the air trapped under the hull between the catamaran sections has the effect of making the ride still softer, in addition to exerting an equalizing effect when the boat is pitching.

The double bottom forward is a safety factor in case of collision with floating or shallow submerged objects, and also obtains a softer ride in rough water by providing a passage through which waves which strike the bow are at least partially diverted.

Still another object is to provide a high-speed boat hull with a planing surface forward terminating in a step beyond which the surface of the hull is subjected to substantial airflow to reduce the wetted area, and to combine with such a hull propulsion means which are set out of line with the direction of travel so as to provide improved control and better turning of the hull at high speed.

The invention includes a number of other structural features for obtaining structural strength in a hull of the character indicated and for reducing friction by reducing the wetted area of the bottom with vented air streams at various locations.

Another object of the preferred embodiment is to provide a boat hull having a V-bottom forward section and a catamaran after section with provision for breaking waves and rough water with the forward section so as to eliminate pounding of the after section cat hulls.

Other objects, features and advantages of the invention will appear or be pointed out as the description proceeds.

Brief description of the drawing

In the drawing, forming a part hereof, in which like reference characters indicate corresponding parts in all the views:

FIGURE 6 is a bottom view of the hull;

FIGURE 7 is a vertical sectional view along the fore-and-aft center lene of the hull, this being the line 7—7 of FIGURE 6;

FIGURE 8 is a sectional view taken on the line 8—8 of FIGURES 9 and 10.

FIGURE 9 is a diagrammatic side elevation showing a modified form of the invention; and FIGURE 10 is a fragmentary bottom view of the modified construction shown in FIGURE 9.

Description of the preferred embodiment

Figure 1:
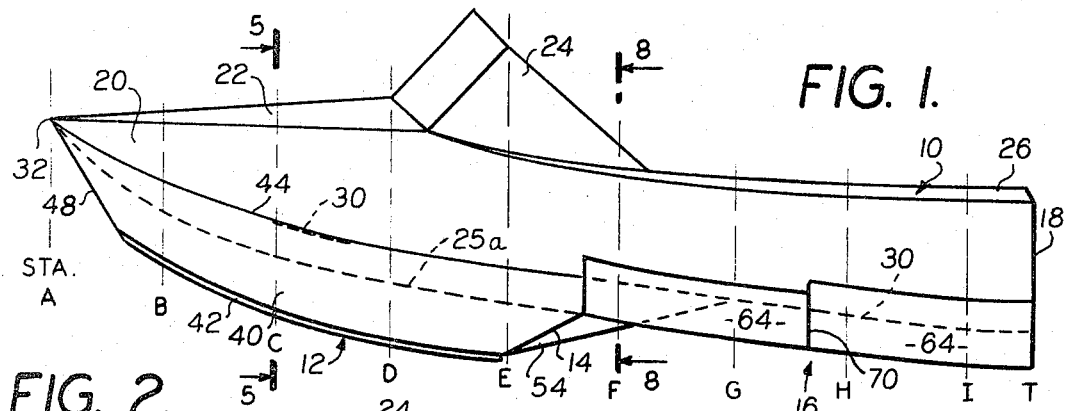
FIGURE 1 is a diagrammatic side elevation of a boat hull made in accordance with this invention.

FIGURE 1 shows a hull 10 having a forward section 12 which terminates at a step 14; and having an aft section 16 extending from the step 14 and terminating in a transom 18. In the construction illustrated, the step 14 does not extend at right angles to the keel line of the hull throughout its full width, though various angles can be used.

The hull has top sides 20, and a deck 22 extending between the top sides 20 at the forward portion of the hull. There is a windshield 24 at the end of the deck 22. Behind the windshield there is a cockpit with narrow side decks 26.

The hull has a bottom 30 which meets the deck 22 at a stem 32 of the hull; and this bottom 30 extends downwardly and aft to the transom 18.

The forward section 12 of the hull has an outer bottom 40 which is a V-bottom. This outer bottom 40 extends upwardly from a center keel 42 to a forward chine 44 and it joins the inside walls 25 along a line 25a.

Figures 2, 3:
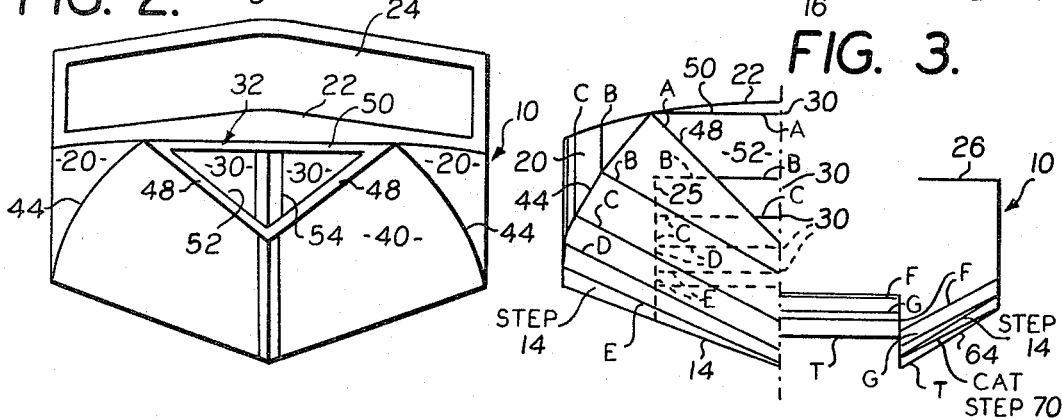
FIGURE 2 is a front view of the hull shown in FIGURE 1.
FIGURE 3 is a diagram showing the shape and location of side and bottom structure at different stations along the length of the hull.

The outer bottom is at a substantial distance below the inner bottom 30 and it terminates in leading edges 48 at the forward end of the hull. These edges 48 are best shown in FIGURES 3 and 6 and they form, with a leading edge 50 of the deck 22, an open triangular entrance 52 into the space between the inner bottom 30 and the outer bottom 40. When the boat is running in smooth water, air flows into this entrance 52. When the water is rough, waves which break against the stem 32 cause water to splash into the entrance 52. To the extent that water flows into the entrance 52, the force of the waves against the stem is broken.

In order to increase the strength of the hull, there is a structure extending between th inner bottom 30 and the outer bottom 40. This structure preferably comprises a separator 54, best shown in FIGURE 6, which is of streamlined form. The separator is hollow and in the construction illustrated, extends for a substantial distance aft beyond the step 14. The step 14 extends from the top sides 20 to the inside walls 25 along sections 56 which are preferably at right angles to the keel line of the hull. Between the inside walls 25, the step 14 has a forward component as it extends inward to the separator 54, and it is vented from the low opening 52, whereas the sections 56 of the step are side vented.

The separator 54 provides an integral structural part to strengthen the hull and bottom while maintaining space between them. It is especially for supporting the outer bottom. Being a simple structural member of minimum thickness, it requires little streamlining of its leading and trailing edges.

The separator is water-tight and hollow, and it contributes to the buoyancy of the forward part of the hull. If desired, it can be made for use as storage space, or used to house part of the propulsion system, pumps or other mechanism.

Figures 4, 5:
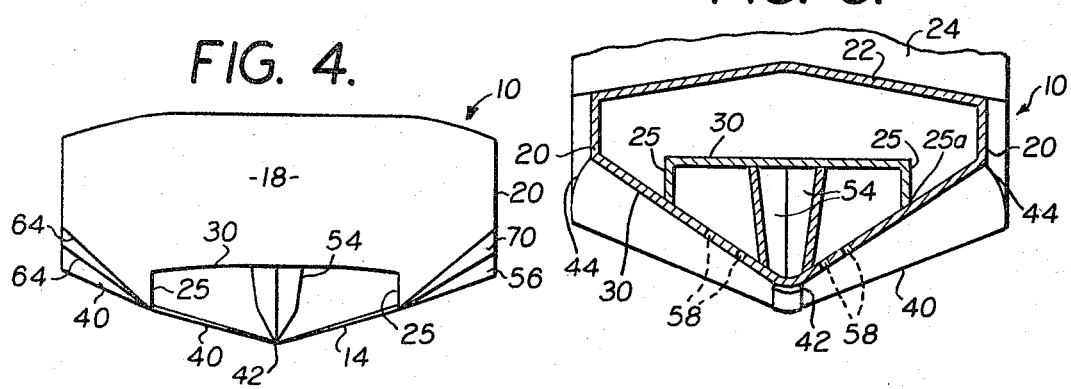
FIGURE 4 is a rear elevation of the hull.
FIGURE 5 is a sectional view taken at the second station of FIGURE 1 as indicated by the section line 5—5 in FIGURE 1.

The air which flows between the inner and outer bottoms at the forward section of the hull is discharged at the step 14 for continued flow across the bottom 30 beyond the step 14 and at this after section of the hull, the bottom 30 is supported, in effect, by a cushion of air between the bottom and the water. The inside walls 25, where they extend aft from the step 14, serve as runners for preventing the escape of air from the channel defined by the bottom 30 and these side walls 25. Between the step 14 and the transom 18, the side walls 25 may be considered as side keels. They also comprise sides of catamaran hulls which are formed by these side walls 25, the side walls 20 and sloping bottoms 64 which close the portion of the hull below the side decks 26. These catamaran hulls, which are continuations of part of the outer V forms forward of the step 56, are highly effective anti-trip surfaces and are achieved by the sections rearward of the steps 56 and 70 (FIGURES 4 and 6).

The bottom 30 is preferably formed with corrugations 66 which extend along its entire length. The portion of the bottom 30 near the transom 18 is preferably made with a slightly concave contour but this is not essential. In the construction illustrated, the step 70 of each of the catamaran sections reduces the wetted surface of the sloping bottoms 64 beyond these steps 70, which are side vented.

The transom 18 is of heavy construction and the hull is braced for propulsion by twin outboards attached to the transom 18. FIGURE 6 shows diagrammatically two outboard motors 74 and 76 attached to the transom 18 and connected so that their slip streams converge along lines 78 when the boat is moving along a straight course. These lines 78, which diverge as they come forward, are preferably spaced by a distance substantially equal to the beam of the hull 10 where the lines 78 reach a transverse line 80 at the step 14.

This facilitates control of the hull at high speed. The step 14 is preferably located ahead of the center of submerged area and ahead of the center of buoyancy of the hull. When the boat is planing, most of the forward portion of the hull is out of the water and very little of the hull behind the step 14 is wetted. The hull turns easily, therefore, as a result of any motor thrust exerted in the direction of either of the lines 78 which is deflected so as to move outward beyond the hull at the mid region of the hull indicated by the transverse line 80, while the thrust of the other motor moves inward toward a center line position. This system of converging ship streams can be applied to ordinary screws (with inboard power) and to water-jet propulsion systems also. More positive directional control (steering) is obtained with individual throttle manipulation when the ship streams converge. This is a safety feature in the event of rudder system disability.

FIGURE 1 shows station A–I at equal distances along the length of the hull, and FIGURE 3 shows the positions of critical parts of the structure at the respective stations.

FIGURES 5 and 7 are sectional views taken at two of these stations, as indicated by the section lines 5—5 and 7—7. In the first of these views, breathing holes or openings 58 are shown in the outer bottom 40 as well as in the separator 54. These openings 58 are preferably made with a slope aft toward their ends which open through what is simetimes a wetted surface. For example, the outer bottom 40 may be wetted over a substantial part of its length when running in rough water and to the extent that air is withdrawn out of the space between the inner and outer bottoms, friction of the outer bottom with the water below the boat is reduced.

The space between the inner and outer bottoms with the entrance 52 at its forward end, exerts a stabilizing action when the hull is pitching. Because of the angle of this entrance 52 (when viewed in profile) the cross section with respect to the air, against which the hull is moving, increases in effect as the bow rises and the entrance 52 becomes more nearly normal to the direction of relative movement of the hull and air. This increases the pressure of the air passing through the space between the inner and outer bottoms and provides more air under the after section of the boat so as to lift the hull aft and thus counteract the rising bow.

If the bow moves lower, the angle of the entrance 52 becomes greater and the pressure of air supplied under the after section of the hull is decreased.

FIGURES 9 and 10 show a modified form of the invention having a separator 84 that corresponds to the separator 54 shown in the other figures, but the separator 84 is wide enough to enclose a water passage way 86 which has a slotted inlet 88, through an outer bottom 12′, and an outlet 90 through a V-drive transmission 96. This provides, in effect, a water jet drive, but other means can be provided for providing a water jet.

The hull can be propelled by a screw propeller at this amidship location, but not housed within the separator. The transmission 96 in FIGURE 9 appears to require a break in the inner bottom but is actually confined within the area above the separator and thus does not affect the passage between the outer and inner bottoms.

The preferred embodiment of the invention has been illustrated and described, but changes and modifications can be made and some features can be used in different combination without departing from the invention as defined in the claims.

What is claimed is:

1. A boat hull including an inner bottom, an outer bottom spaced from the inner bottom, top sides extending upward from at least one of the bottoms, a chamber enclosed between the inner and outer bottoms, said chamber being open between the inner and outer bottoms at both its forward and aft ends, and the outer bottom sloping upward at its forward end to locate the forward opening into the chamber at a level above the water line of the hull when under way, the outer bottom extending from the forward end of the hull to a region amidships and terminating at a step, the aft opening of the chamber being at said step, the bottom beyond the step having a deeper draft along both sides of the hull than between said sides, the bottom between the deeper draft sides forming an inverted channel along which the air from the aft opening of the chamber flows to the stern of the hull to increase the buoyancy of the hull beyond the step and to decrease its wetted surface.

2. The boat hull described in claim 1 characterized by the deeper draft sides of the hull being catamaran sections extending aft from said step, and the inner sides of the catamaran sections being the sides of the inverted channel.

3. The boat hull described in claim 2 characterized by the bottoms of the catamaran sections sloping upward and outward and there being steps in said catamaran sections to reduce their wetted area.

4. The boat hull described in claim 1 characterized by the inner bottom extending downward as it extends aft of an amidships region, and the outer bottom extending under all of the inner bottom that is forward of the amidships region and below the water line when the boat is under way whereby the outer bottom protects the inner bottom from injury by striking submerged or partially submerged objects, and separator means comprising connected structure extending from the inner to the outer bottom over a limited area of the confronting surfaces of said inner and outer bottoms, and bracing said outer bottom from the inner bottom.

5. The boat hull described in claim 1 characterized by a separator connecting the inner bottom with the outer bottom along a keel line of the hull and comprising a streamline structure extending from the forward portion of the outer bottom to a location spaced a substantial distance aft of the step.

6. The boat hull described in claim 1 characterized by the top sides including outer top sides extending upward from the outer bottom and inner top sides extending from the inner bottom to the outer bottom forward of the step and forming the sides of the inverted channel aft of the step.

7. The boat hull described in claim 1 characterized by the outer bottom being a V-bottom that meets the top sides along a chine and the inner bottom being substantially flatter transversely than the outer bottom.

8. The boat hull described in claim 7 characterized by the outer bottom coming to a substantial point at its forward end and the inner bottom being relatively wide at its forward end, the forward opening into the chamber being generally triangular with the apex of the triangle at the bottom of the opening.

9. The boat hull described in claim 7 characterized by the outer bottom terminating at a step amidships, the aft opening from the chamber being at the step, catamaran sections of the hull aft of the step and forming skirt sections for confining air under the portions of the hull aft of the step, the catamaran sections having sloping bottoms on at least the outsides thereof forming continuations of part of the outer V form forward of the step.

10. The boat hull described in claim 1 characterized by the opening at the forward end of the chamber having edge portions that slope both downward and aft as they extend downward, the opening being shaped to present a projection on a vertical plane transverse of the length of the hull, which projection increases in cross-section to increase the air pressure in the chamber and the buoyancy of the inverted channel as the forward end of the hull rises to a higher angle of attack.

11. A boat hull having a forward portion with a V-bottom extending aft to an amidships section of the hull, catamaran sections of the hull beyond said amidships section and extending therefrom to the aft end of the hull, the outsides of the catamaran sections being substantial extensions of the forward portions of the hull and the space between the insides of the catamaran sections being covered by a bottom structure that is substantially higher than the bottoms of the catamaran sections and that forms with the catamaran sections an inverted channel for passage of air under the hull between the catamaran sections, and an air inlet opening through the hull into the forward end of the inverted channel and extending transversely across the inverted channel.

12. The boat hull described in claim 11 characterized by twin propulsion means oriented to direct slip streams aft along lines that converge with one another to facilitate steering of the hull.

References Cited

UNITED STATES PATENTS

| | | | |
|---|---|---|---|
| 1,831,697 | 11/1931 | Ziegler | 114—66.5 X |
| 2,373,019 | 4/1945 | Dix | 114—66.5 |
| 2,488,183 | 11/1949 | Garmont | 114—66.5 X |
| 2,562,372 | 7/1951 | Tveter | 9—6 |
| 2,875,720 | 3/1959 | Hupp | 114—66.5 |
| 3,076,426 | 2/1963 | Alexander et al. | 114—66.5 |
| 3,203,015 | 8/1965 | Cale | 9—6 |
| 3,239,856 | 3/1966 | Stocking et al. | 9—6 |
| 3,294,054 | 12/1966 | Norton | 115—37 |

FOREIGN PATENTS

| | | |
|---|---|---|
| 1,025,454 | 4/1966 | Great Britain. |

MILTON BUCHLER, *Primary Examiner.*

R. A. DORNON, *Assistant Examiner.*